United States Patent [19]
Erway

[11] Patent Number: 5,750,165
[45] Date of Patent: May 12, 1998

[54] METHOD OF PREPARING A REFRIGERATED POTATO PRODUCT

[76] Inventor: Dale E. Erway, R.D. #2 Box 253, Genesee, Pa. 16923

[21] Appl. No.: 632,897

[22] Filed: Apr. 16, 1996

[51] Int. Cl.$^6$ .............................. A23B 7/10; A23K 1/00; A23K 3/00; A23C 3/00
[52] U.S. Cl. .............................. 426/49; 426/52; 426/262; 426/268; 426/321; 426/324; 426/326; 426/335
[58] Field of Search .............................. 426/49, 52, 262, 426/268, 321, 324, 326, 335

[56] References Cited

U.S. PATENT DOCUMENTS

| | | |
|---|---|---|
| 3,794,739 | 2/1974 | Lee et al. . |
| 4,362,750 | 12/1982 | Swartz ........................ 426/59 |
| 4,599,313 | 7/1986 | Gonzalez . |
| 4,789,553 | 12/1988 | McIntyre et al. . |
| 4,790,994 | 12/1988 | Martrozza et al. . |
| 4,874,704 | 10/1989 | Boudreaux et al. . |
| 4,929,445 | 5/1990 | Vandenbergh . |
| 4,971,821 | 11/1990 | McIntyre . |
| 5,162,127 | 11/1992 | Weiss et al. ........................ 426/268 |
| 5,173,319 | 12/1992 | Boudreaux et al. ........................ 426/326 |
| 5,186,962 | 2/1993 | Hutkins et al. . |
| 5,204,133 | 4/1993 | Hibbs et al. . |
| 5,308,632 | 5/1994 | Howard et al. . |
| 5,312,639 | 5/1994 | Howard et al. . |
| 5,332,587 | 7/1994 | Howard et al. . |
| 5,447,734 | 9/1995 | Street ........................ 426/326 |
| 5,573,800 | 11/1996 | Wilhoit ........................ 426/326 |

*Primary Examiner*—Donald E. Czaja
*Assistant Examiner*—Jacqueline A. Ruller
*Attorney, Agent, or Firm*—Thomas R. Shaffer, Esq.

[57] ABSTRACT

A method of processing an ESL (extended shelf-life) refrigerated potato product (various cuts) is disclosed. The product is acid blanched when pasteurized and then "seeded" with lactic acid starter culture. The prepared product line has desirable organoleptic qualities and can be stored at refrigerated temperatures typical of commercial retail stores (30°–56° F.) as well as the home refrigeration system. The products have been proven to be pathologically safe when exposed to extended periods of temperature abuse.

16 Claims, 1 Drawing Sheet

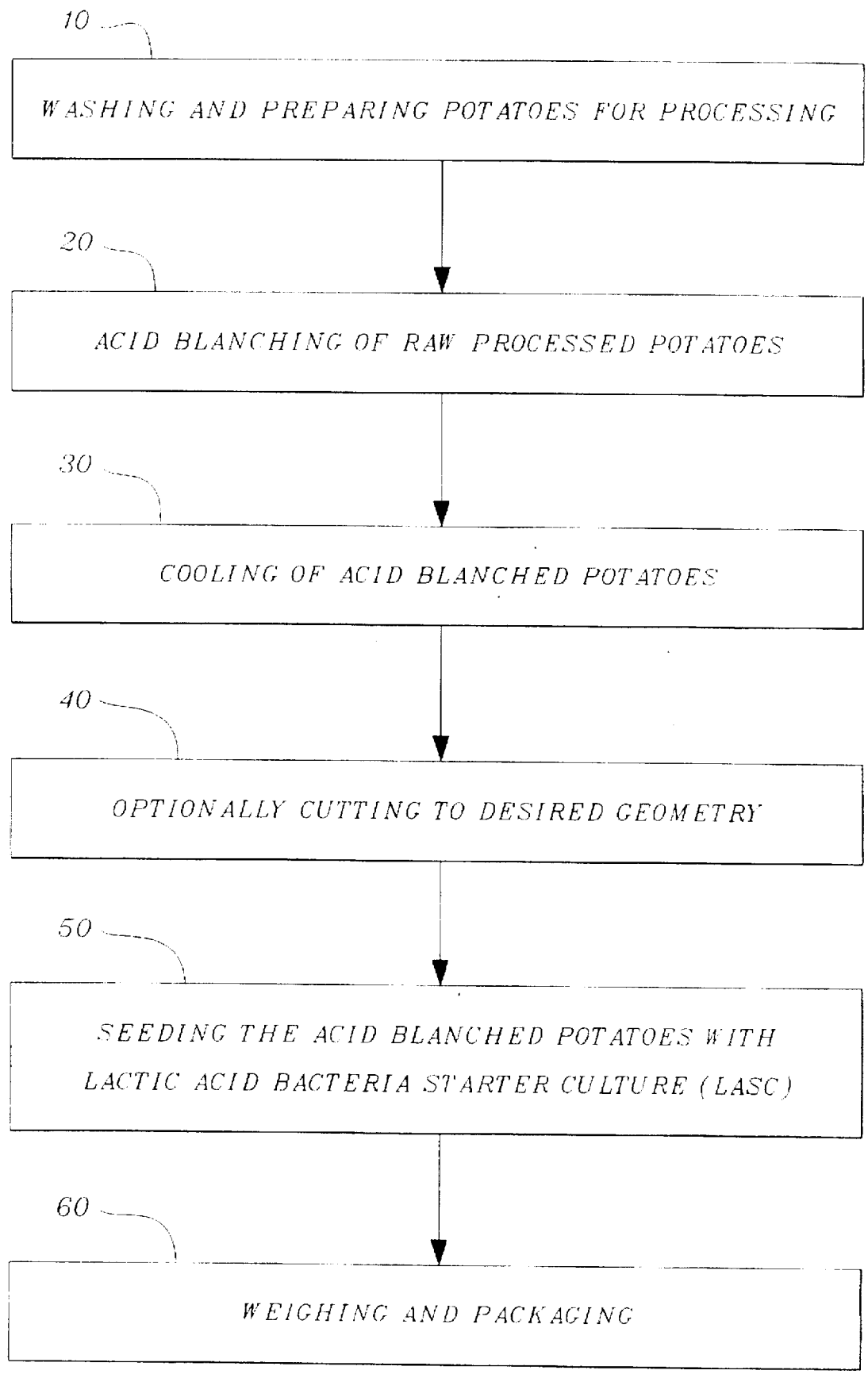

METHOD OF PREPARING A REFRIGERATED POTATO PRODUCT

BACKGROUND OF THE INVENTION

1. Field of the Invention

The present invention relates to a method of processing and packaging potatoes in a manner which allows factory cut raw potatoes to maintain a natural white color and which protects the potatoes from premature spoilage. More specifically, the present invention relates to a potato processing method for a refrigerated potato product line to be marketed in the retail food sector with extended shelf life (ESL) properties that has the organoleptic qualities of fresh prepared potatoes without the use of synthetic chemicals as preservatives while still remaining pathologically safe.

2. Description of the Art

The potato, whose origin and use as a nutritional staple for civilizations, can be traced to South America in approximately 6000 B.C. where the Peruvian Indians have over a thousand words to describe the many different varieties of potatoes found there. The Inca Indians probably prepared the first freeze-dried food by producing "CHUNO". This process is still carried out in the highlands of Bolivia, Chile and Peru which allows newly harvested potatoes spread upon the ground to freeze overnight and thaw in the hot morning sun. At midday, barefoot men, women and children trample them squeezing the excess moisture from the tubers, where they dry again in the afternoon sun. This goes on for up to three weeks until the tubers are a dry, grayish material resembling stones. "Chuno" is lightweight, hard, and will keep for up to 4 years. (National Geographic—May 1982, pp. 668–694).

The potato is the second most consumed food in the U.S.—trailing only after milk products. This increasing per capita utilization rate (PCUR) (see Table I) is correlated with a number of factors including the availability of different forms of potato products (i.e. canned, dehydrated, snack foods, frozen and fresh). A second significant factor which impacts consumption is the affluence of the buying public to be able to purchase the varied forms of "prepared" potato products.

TABLE I

| | | U.S. PER CAPITA UTILIZATION OF POTATOES IN POUNDS OF FARM WEIGHT | | | | |
|---|---|---|---|---|---|---|
| YEAR | FRESH | FROZEN | CHIPS | DEHYD | CANNED | TOTAL |
| 1985 | 46.3 | 45.4 | 17.6 | 11.2 | 1.9 | 122.4 |
| 1986 | 48.8 | 46.3 | 18.2 | 10.9 | 1.8 | 126.0 |
| 1987 | 47.9 | 47.9 | 17.6 | 10.8 | 1.8 | 126.0 |
| 1988 | 49.6 | 43.3 | 17.2 | 10.4 | 1.9 | 122.4 |
| 1989 | 50.0 | 46.8 | 17.5 | 10.8 | 2.0 | 127.1 |
| 1990 | 45.8 | 50.2 | 17.0 | 12.8 | 1.9 | 127.7 |
| 1991 | 46.4 | 51.3 | 17.3 | 13.7 | 1.7 | 130.4 |
| 1992 | 48.9 | 51.0 | 17.5 | 13.2 | 1.8 | 132.4 |
| 1993 | 49.7 | 54.5 | 17.6 | 13.4 | 1.7 | 136.9 |
| 1994 | 49.1 | 59.4 | 17.1 | 13.5 | 1.7 | 140.8 |
| 1995* | 49.8 | 58.4 | 17.0 | 13.3 | 1.7 | 140.2 |
| 1996* | 49.8 | 58.8 | 16.9 | 13.4 | 1.7 | 140.6 |

*estimate

Looking at Table I, the wide range of customer appeal is very striking. The canned potato products probably have had the lowest percentage of PCUR because of a noticeable change in the organoleptic qualities that are inherent in the heat process to enable the product to be shelf stable for over a year.

The dehydrated products are convenient from a waste and time of food preparation viewpoint and are quite inexpensive due to the fact that the grade quality of the raw product need not be high. However, the texture of the finished product is generally perceived to be less than average.

The snack food potato markets have maintained a relatively flat growth since 1985, but are coming under increasing consumer scrutiny as the buying public is made more aware of fats and salts in their daily diets.

The frozen potato products have had steady growth in the total number of potatoes utilized. This can be attributed to at least three factors. Frozen potato products have become common place in the commercial and institutional feeding sectors because of their convenience and finished product consistency. The second reason can be the growing affluence of the public to purchase this convenience and thirdly, the many enhanced forms of convenient frozen products offered to the public. Frozen product costs are relatively high due to the peeling, blanching, freezing and storage but the end consumer is willing to purchase the convenience even though they perceive the product is nutritionally and organoleptically second to fresh products.

The fresh potato utilization is significant in the context of total per capita consumption but has ascended to a close second place behind frozen products. This fact underscores the importance of convenience of products relative to the perceived freshness of the product. Generally speaking, the traditional fresh package of potatoes (50 pound, 10 pound, 5 pound bags) produce the most desirable culinary characteristics but is the most time consuming and waste producing of all of the above discussed potato product categories—but is still a close second in public popularity.

In very recent years, the pre-cut vegetable industry has demonstrated an unusually high level of acceptance in the retail food industry. This would allow the assumption that the buying public wants the quality and characteristics of fresh vegetables but is very interested in less preparation time. The popularity of the refrigerated food sales sector by the buying public is increasing and retail sales have doubled every two years for the last six years. These new lines of extended shelf life (ESL) products have to meet the expectations of the consuming public as well as the food safety issues that are monitored by the regulatory agencies.

Making potatoes adaptable to the extended shelf life (ESL) concept would fill a niche of significant magnitude. This is especially true if accomplished in a manner which results in the convenience of no waste products in the home, no product preparation time and a reduced meal cook time.

As a convenience to the consumer and as a method of assuring the safest possible product, there is a need for blanched, factory peeled, cut and packaged potatoes.

It is known to be advantageous to cook potatoes without the peel to reduce phenols, total glycoalkaloids, bitterness and discoloration. N. Mondy et al., *J. Food Protection* 53:756–759.

The use of storage temperatures below 40° Celsius is known in the art to prevent or retard the growth of toxin production by *Clostridium botulinum* in vacuum-packed, cooked potatoes. It is also known that enhanced protection and shelf life may be achieved by dipping the potatoes in a solution of ascorbic acid and citric acid before vacuum packing. S. Notermans et al., *J. Food Protection* 48:851–855 (1985).

In the past, sulfite-containing additives have been used extensively as anti-browning agents to keep fruit and vegetables fresh looking. One recently suggested method to prevent browning without sulfides is the use of a heated solution of ascorbic acid and citric acid to extend shelf life to control browning in pre-peeled potatoes. Gerald M. Sapers et al., *J. Food Science* 60:762–776 (1995). An earlier method which avoids the use of sulfides is taught to provide a 14 day plus refrigerated shelf life for fresh prepared potatoes. Such method utilizes a chemical treatment (again including ascorbic acid and citric acid) combined with a packaging system which removes most of the air and therefore, oxygen from the package and then sealing. Thomas T. Langdon, *Food Technology*, pp. 64–67 (May 1987).

It is also generally known in the art that the use of a living bacteria strain in combination with edible foods which are vacuum packaged and/or refrigerated can increase shelf-life and inhibit growth of food spoilage or foodborne pathogenic organisms. See Hoover et al., *Journal for Food Protection*, Vol 51, pp 29–31 (January 1988); *Food Processing*, page 58 (July 1981); and S. Notermans et al., *J. Food Protection* 48:851–855 (1985).

M. Raccach, et al., *Journal of Food Science*, Vol 44, No. 1, pp. 44–47 teaches lactic acid bacteria produce metabolites which have the ability to suppress the growth of some bacterial species. In this study, living cells of the lactic acid bacterias (LAB), *Pediococcus cervisiae* and *L. plantrum*, were separately added to different samples of mechanically de-boned poultry meat (MDPM). By using either of the LABS, it was possible to prolong the shelf life of refrigerated MDPM by 2–3 days. (pp. 46–47).

M. Daeschel, *Food Technology*, pp. 164–167 (January 1989), teaches that a wide variety of raw foods are preserved by lactic acid fermentation including raw vegetables. By way of an historical teaching, Daeschel also teaches:

> Although fermented foods date back into antiquity, the observation that certain microorganisms are responsible for the preserving effect was not generally acknowledged until the turn of the last century. Early research confirmed that fermented foods preserved well because of the souring effect that certain bacteria imparted to the food by the conversion of sugars to organic acids. Reduction in pH and removal of large amounts of carbohydrate by fermentation are the primary preserving actions that these bacteria provide to a fermented food. However, it has also been recognized that LAB are capable of producing inhibitory substances other than organic acids (lactate and acetate) that are antagonistic toward other microorganisms. These substances are produced in much smaller amounts and include hydrogen peroxide, diacetyl, bacteriocins *** (etc.). (page 164).

Hutkins et al., U.S. Pat. No. 5,186,962, and the patents therein cited also teach the use of living cells of non-fermenting or non-growing lactic acid bacteria to deliver bacteriocin into edible food substances to inhibit the growth of food spoilage or foodborne pathogenic organisms.

Although there has been significant advances with certain meat, milk and vegetable products, with respect to the particular problems associated with potatoes, there remains a need for a safe, packaged potato product which has the taste, texture and color variation normally associated with fresh-cut potatoes but a significant reduction in preparation time.

It is thus a specific objective of this invention to provide a potato product (whole, sliced, diced and shredded) which, when finished at home, has the taste, texture and color variation normally associated with fresh-cut potatoes but a significant reduction in preparation time.

It is another objective of this invention to provide a potato product (whole, sliced, diced and shredded) that can be stored for an adequate period of time under conventional refrigeration between process and consumption without noticeable deterioration in color, texture, taste or characteristics including microbiological quality.

It is the objective of this invention to provide a potato product (whole, sliced, diced and shredded) that is pathologically safe for the consuming public while utilizing conventional refrigeration, and having no artificial (synthetic) preservatives.

It is an objective of this invention to provide the customer with a potato product that reduces their meal preparation time by providing a cleaned, sized, portion-controlled product that will have a reduced finished cooking time.

SUMMARY OF THE INVENTION

These and other objectives of the present invention are met by the method of preparing the potato product (whole, diced, sliced and shredded) as specified. In its simplest form, the method of processing potatoes according to the present invention includes the steps of peeling, washing, cutting, acid blanching, cooling, "seeding", vacuum packaging and storing the potatoes in refrigerated conditions until use.

Preferably, the method of the present invention includes the steps of: preparing fresh potatoes by pre-peeling (or leaving the epidermis on the tuber); cutting the potatoes in described geometries and washing accordingly; stabilizing (inhibiting) the enzymatic browning of the potato product by acid blanching; cooling the potato product; seeding the potato product with lactic acid starter culture (LASC) (preferably Custom Culture Blend PC or Custom Culture Blend $PO_2$ as available from A.B.C. Research Corp. of Gainsville, Fla.); packaging the potato products in barrier film bags under a partial vacuum pressure; and storing the package of potato products at refrigerated temperatures until ready for use. Potato products processed in accordance with the invention have a shelf life of 10 to 14 days.

A method of preparing a refrigerated extended shelf life potato product comprising the steps of washing and preparing raw potatoes for processing; acid blanching of the prepared raw potatoes; cooling of the acid blanched potatoes; seeding the acid blanched potatoes with a lactic acid bacteria starter culture; and packaging the potatoes is disclosed. The acid blanching further comprises the use of a solution of Glucono delta-lactone (GDL) in concentrations by weight of about 0.1 to 1.2% (preferably in concentrations by weight of about 0.1 to 1.0%, more preferably in concentrations of about 0.3 to 0.9, and still more preferably in concentrations of about 0.5–0.7%).

The GDL reduces the potato substrate pH to a range of about 5.7 to 4.7 after blanching and more preferably to a range of about 5.5 to 5.2. The GDL aids in deactivating the enzymatic action causing color deterioration in the final potato product. The GDL also reduces the color deterioration of the final product due to metal ions contacted during processing.

The "seeding" includes the provision of a population of living cells of lactic acid bacteria cells to the potato product to inhibit the growth of food spoilage or pathogenic organisms in the potato product by allowing fermentation of the potato substrate by said population of living cells. The population of living cells of lactic acid bacteria cells preferably includes cells of the bacteria *Pediococcus acidilactic*.

The method according to the present invention preferably provides a population of living lactic acid bacterial cells which produce cellular lactic acid accumulation at a temperature of 1°–7° C.

Preferably, the finished packaged potato product is maintained at a temperature of about 1°–7° C. and is initially packaged under aerobic or partially aerobic conditions. The method herein disclosed provides organoleptic characteristics of the finished potato product which are not significantly altered by the presence of the lactic acid bacteria.

Preferably, the potato product can be stored for period of approximately 10–14 days at temperature abuse levels of about 8° C. to 12° C. without noticeable deterioration in color, texture or taste and remain pathogenically safe. Further, even if the potato product can be stored for a period of approximately 96 hours at temperature abuse levels of about 13° C. to 30° C. the product will remain pathologically safe, although it will most likely then become organoleptically unacceptable.

The method according to the present invention further allows for the cutting of the potatoes to any desired geometric shape or the use of whole, uncut potatoes.

BRIEF DESCRIPTION OF THE DRAWING

FIG. 1 is a flow diagram of a process for preparing potatoes according to the present invention.

DETAILED DESCRIPTION OF THE PREFERRED EMBODIMENTS

The marketing field of extended shelf life (ESL) is expanding rapidly and is responding to the seeming desires of the buying public to have fresher, healthier and if possible, fewer or no preservatives included in their diets! If the ESL products are low acid (above a pH>4.6) and have no preservatives added, then the only defense against botulinum toxigenesis is the presence of competitive microorganisms and refrigeration. In vegetables where enzymatic browning seriously devalues the product, heat deactivation (pasteurization) is presently the only realistic method to retain the value of the pre-cut product. The step of pasteurization eliminates the growth of competitive microflora and thus only the refrigeration barrier exists to prevent the germination and growth of heat resistant bacterial spores including spores of Clostridium botulinum. Temperature abuse (lack of proper refrigeration) can happen at points of manufacturing, distribution, retail or even consumer levels.

The present invention is based upon the concept that a secondary barrier procedure is advantageous in maintaining the potato product's safety integrity when it is exposed marketing in the retail sector of the food supply chain. A back-up system is prudent when dealing with the food handling habits of the general public.

Referring to the flow chart of FIG. 1, step 10 is accomplished by techniques that are known in the art. The raw potatoes may be taken as field-run (non-sized) from direct harvest or conventional storage supplies. If stored potatoes are used, it is preferred that they be warmed (48°–52° F.) prior to moving to reduce the amount of tuber damage incurred while mechanically moving the tuber through the process.

Potatoes enter the processing plant and are cleaned and may be peeled or remain unpeeled. Trimming and defect removal are achieved by normal techniques of the industry. In step 40, the raw potatoes may be cut or sized at this stage of the process by standard processing machinery. (Step 40 can optionally be preformed after step 10 or after step 30.) The washing and rinsing of the whole or cut potato can be done in chlorinated rinse of 50 ppm and then transported or retained in acidified $H_2O$ until further processing. The inhibiting (or stabilization) of the enzymatic browning is the next step in the process but this step differs significantly from the prior art process.

The hot water blanching typical to the industry is done with two objectives in mind. First, as is known in the art, blanching heats the potato tissue throughout at time and temperature conditions high enough to inactivate the enzymes, which would otherwise cause oxidative darkening of the potato tissue, but not sufficient to soften the tissue enough for normal consumption. By the addition of a sodium acid pyrophosphate (SAPP) or other phosphate based derivatives known in the art, the second objective can be accomplished which is the elimination of after cook browning (known in the trade as millard browning).

In step 20, the present invention, unlike the prior art, uses a non-synthetic substance, glaucoma-delta-lactone (GDL) as an additive to the hot water blanch. GDL, because it is a "sweet acid" (i.e. has the ability to lower pH of substances without the inherent sour or astringent flavor profiles of other acidulants), can lower the pH of the naturally bland potato product to a pH range where the pathenogenic bacteria are in an adversarial growth atmosphere. pH ranges of 5.5 to 4.4 can be obtained without a change in the taste profile of the potato product.

The cooling step 30 is accomplished by means of prior art processes known to the industry (i.e. mechanical refrigeration, vacuum cooling, $CO_2$ etc).

Step 50 is unique to this invention and accomplishes at least three objectives. First, the "seeding" of lactic acid starter culture (specifically, Custom Culture Blend PC or Custom Culture Blend $PO_2$) on the potato product provides a specific biological flora of Pediococcus acidilactici bacteria in the range of $10^4$–$10^8$ cfu/g (colony forming units per gram) and more preferably in the range of $10^4$–$10^6$ cfu/g which competes against pathological bacteria that might be present thereby inhibiting the growth of such pathological bacteria. Secondly, the cellular growth rate of Pediococcus acidilactici has been shown to be temperature sensitive. Therefore, when the potato product (whole, diced, sliced or shredded) is properly refrigerated (32°–42° F.) the fermentative growth rate of the cell population is very modest and reflects only approximately a 0.5 downward shift in product pH over the extended shelf life of the potato product. The third objective is accomplished only if and when the potato product is temperature abused somewhere in the food distribution chain or in the possession of the buying public (i.e., the consumer forgets and leaves this refrigerated grocery item in the trunk of the car for 48 hours in the month of August). The "seeded" LASC Custom Cultures Blend PC or $PO_2$ will grow exponentially because of its voracious appetite for the available carbohydrates. Significant amounts of lactic acid will be produced thus further lowering the pH levels of the ESL potato products. Parthenogenic challenge tests verify that the rate and extent of lactic acid accumulation in the potato products during temperature abuse was sufficient to preclude (inhibit) botulinum toxigenesis.

Referring to FIG. 1, a process for preparing a fresh raw potato to be used in accordance with the present invention to make a blanched, refrigerated, extended shelf life product is shown. The preferred process, includes the following steps:

Step 10 preparing potatoes for processing which could include washing, trimming and/or peeling in the fashion known to the industry (steam peeling with machine such as P. Kuntz Model 400 or abrasive peeler Vanmark Model #27);

Step 20 acid blanching of potatoes in "GDL" (Glucono delta-lactone) to acidulate the potato pulp (in any form, cut into pieces or whole potato shapes);

Step 30 cooling the acid blanched as whole or in particle sizes as desired cuts by conventional refrigeration or evaporative cooling as known to the industry with such equipment as ammonia systems or a vacuum system of evaporative cooling (such as manufactured by Croll-Renolds. Co. of Westfield, N.J.);

Step 40 cutting the potatoes to the desired geometric shape (sliced, diced, shredded, french fry, etc.) with equipment such as Urschell model GK or CC.

Step 50 "seeding" of potato product particles with lactic acid starter culture, by use of sterilized compressed air, in conjunction with programmable metering pump such as is commercially available from Cole-Parmer of Niles, Ill., Model No. Mastoflex digital pump and which utilizes air assisted spray nozzles such as are available from Spray System of Wheaton, Ill., model No. SU14.

Step 60 weighing and packaging processed potatoes (including all sizes of particles) with thermo form, fill, vacuum, seal (FFVS) machine using a relatively low O.T.R. (oxygen transmission rate) barrier film. The finished extended shelf packed product is refrigerated at normal commercial temperatures immediately and throughout the balance of its expected shelf life.

The raw potatoes to be used to make the extended shelf life product may be field run (multi-sized) or from conventional storage without regards to storage temperature (typical range can be from 34°–60° F.). In general, the initial processing step 10 is accomplished by techniques that are known in that art. The peeling may be done with at least two methods, steam peeling such as accomplished with a Paul Kuntz steam peeler system Model #400 and/or abrasive peeling with such a machine produced by Vanmark Model #27. In any event, the epidermis of the potato tuber can be removed if desired for the finished extended shelf life product.

The acid blanch process (step 20) is the first of four critical steps and is performed after cleaning and trimming or after peeling. The potato can be acid blanched as whole or in the desired finished product particle size (i.e. sliced, diced or shredded). The organic acid utilized is GDL and is supplied by PMP Corp of Rosemont, Ill. GDL provides a degree of ion-sequestrant which reduces some forms of product discoloration while its primary function is of a pH control agent without changing the organoleptic qualities of the finished product. The natural pH of potatoes is in the range of 7.0 to 6.3 which presents a good medium for all bacteria to grow and possibly form toxins.

The utilization of GDL as the acid in the blanch water can lower the potato pulp to pH levels in ranges of 5.7 to 4.7 which in itself can have an adversarial effect on undesirable microbial growth. These pH ranges can be obtained without creating an undesirable taste profile in the potato pulp. Concentration of GDL in blanch water can range from about 0.1% to 1.2% w/w preferably in the range of approximately 0.5% to 0.7%, while the time and temperature parameters are commonly known to the industry (15–20 minutes and 165° F.–190° F., respectively).

The blanching serves at least four purposes, namely: reduction of pulp pH; pasteurization of product; deactivation of enzyme on potato tissue; and par-cooking of product.

After the acid blanching is achieved, the cooling process (step 30) that is used is not unique to this invention. Common throughout the art is mechanical refrigeration (i.e. the use of ammonia, freon and $CO_2$) and becoming more popular in the food industry is the use of evaporative cooling (i.e. cooling because of the presence of a partial vacuum).

The next required process step (step 50) deviates dramatically from the state of the art in processing potatoes and other vegetables. The "seeding" or application of LASC to the blanched, cooled product enables the extended shelf life product to have a secondary layer of protection (microbial) to withstand temperature abuse conditions that very well can be a reality in the retail and consumer cold chains. The product to be "seeded" should be done in such a manner that all surfaces are in contact with the bacteria colonies. The rate of application needs to be consistent throughout the process as does the level of sanitization that must be maintained.

The above "seeding" objectives are obtained by use of a vibrating shaker to which the finished product particles are presented. The shaker surfaces are stainless steel screens to allow excess moisture to escape, provide a sanitary contact surface and to cause the product particles to be turned in many directions.

The weighing and packaging of the extended shelf life product is accomplished on standard equipment typical in the art. Electronic weighers such as available from Ilapak, having offices at Newtown, Pa.; or Ishita Co. Ltd., Heat and Control of San Francisco, Calif. Thermoform packaging machines such as Mahafy-Harder of N.J. or Multivac of Germany will do the packaging with the appropriate barrier film. Vacuum capabilities are required to create a "soft pouch" package.

The present invention provides a method of preparing a pathologically safe refrigerated potato product which may be sliced, diced, shredded or whole for the retail market which has an extended shelf life (ESL) between processing, marketing and consumer consumption at temperatures of 1° C.–7° C. for a period of about 10–14 days without noticeable deterioration in color, texture or taste.

While I have shown and described the presently preferred embodiments of my invention, it is to be distinctly understood that the invention is not limited thereto and may be otherwise variously practiced within the scope of the following claims:

I claim:

1. A method of preparing a refrigerated potato product comprising the steps of:
   a) washing and preparing raw potatoes for processing;
   b) acid blanching of the prepared raw potatoes in a solution of Glucono delta-lactone (GDL);
   c) cooling of the acid blanched potatoes;
   d) seeding the acid blanched potatoes with a lactic acid bacteria starter culture, wherein said seeding includes the provision of a population of living cells of lactic acid bacteria cells to the potato product to inhibit the growth of a food spoilage or pathogenic organisms in the potato product by causing fermentation of the potato substrate by said population of living cells; and
   e) packaging the potatoes.

2. A method according to claim 1, wherein said acid blanching further comprises the use of a solution of Glucono delta-lactone (GDL) in concentrations by weight of about 0.1 to 1.2%.

3. A mothod according to claim 1, wherein said acid blanching further comprises the use of a solution of Glucono delta-lactone (GDL) in concentrations by weight of about 0.5–0.7%.

4. A method according to claim 2, wherein said GDL reduces the potato substrate pH to a range of about 5.7 to 4.7 after blanching.

5. A method according to claim 2, wherein GDL reduces the potato substrate pH to a range of about 5.5 to 5.2 after blanching.

6. A method according to claim 2, wherein said GDL aids in deactivating the enzymatic action causing color deterioration in the final potato product.

7. A method according to claim 2, wherein said GDL reduces the color deterioration of the final product due to metal ions contacted during processing.

8. A method according to claim 1, wherein said population of living cells of lactic acid bacteria cells include cells of the bacteria Pediococcus acidilactic.

9. A method of preparing a refrigerated potato product comprising the steps of:
   a) washing and preparing raw potatoes for processing;
   b) acid blanching of the prepared raw potatoes;
   c) cooling of the acid blanched potatoes;
   d) seeding the acid blanched potatoes with a lactic acid bacteria starter culture; and
   e) packaging the potatoes, wherein said seeding includes the provision of a population of living cells of lactic acid bacteria cells to the potato product to inhibit the growth of a food spoilage or pathogenic organisms in the potato product by allowing fermentation of the potato substrate by said population of living cells and wherein said population of living lactic acid bacterial cells produce extra cellular lactic acid accumulation at a temperature of 1°–7° C.

10. A method according to claim 1 further comprising the step of maintaining the finished packaged potato product at a temperature of about 1° C. –7° C.

11. A method according to claim 1 further comprising the step of initially maintaining the finished packaged potato product under aerobic or partially aerobic conditions.

12. A method according to claim 1, wherein organoleptic characteristics of the finished potato product are not significantly altered by the presence of the lactic acid bacteria.

13. A method of preparing a refrigerated potato product comprising the steps of:
   a) washing and preparing raw potatoes for processing;
   b) acid blanching of the prepared raw potatoes;
   c) cooling of the acid blanched potatoes;
   d) seeding the acid blanched potatoes with a lactic acid bacteria starter culture; and
   e) packaging the potatoes, wherein said potato product can be stored for period of approximately 10–14 days at temperature abuse levels of about 8° C. to 12° C. without noticeable deterioration in color, texture, taste and remain pathogenically safe.

14. A method of preparing a refrigerated potato product comprising the steps of:
   a) washing and preparing raw potatoes for processing;
   b) acid blanching of the prepared raw potatoes;
   c) cooling of the acid blanched potatoes;
   d) seeding the acid blanched potatoes with a lactic acid bacteria starter culture; and
   e) packaging the potatoes, wherein said potato product can be stored for period of approximately 96 hours at temperature abuse levels of about 13° C. to 30° C. while remaining pathologically safe but wherein the potato product's organoleptically qualities becomes significantly altered.

15. A method according to claim 1 further comprising the step of cutting the potatoes to any desired geometric shape.

16. A method of preparing an extended shelf life refrigerated potato product comprising the steps of:
   a) washing and preparing raw potatoes for processing;
   b) acid blanching of the prepared raw potatoes in a solution of Glucono delta-lactone (GDL) in concentrations by weight of about 0.1 to 1.2%;
   c) cooling of the acid blanched potatoes;
   d) seeding the acid blanched potatoes with a population of living cells of lactic acid bacteria cells to the potato product to inhibit the growth of a food spoilage or pathogenic organisms in the potato product by causing fermentation of the potato substrate by said population of living cells;
   e) packaging the potatoes and maintaining the finished packaged potato product at a temperature of about 1°–7° C. under anaerobic conditions.

* * * * *

UNITED STATES PATENT AND TRADEMARK OFFICE
CERTIFICATE OF CORRECTION

PATENT NO.   : 5,750,165
DATED        : May 12, 1998
INVENTOR(S)  : Dale E. Erway It is certified that error appears in the above-indentified patent and that said Letters Patent is hereby corrected as shown below:

Column 2, line 55, after "below" delete "40" and insert -- 4 --

Column 8, line 1 of claim 3, delete "mothod" and insert -- method --

Signed and Sealed this

Fourteenth Day of July, 1998

Attest:

BRUCE LEHMAN

Attesting Officer

Commissioner of Patents and Trademarks